United States Patent [19]

Ishii

[11] Patent Number: 4,844,545
[45] Date of Patent: Jul. 4, 1989

[54] HEADREST APPARATUS

[75] Inventor: Minoru Ishii, Kariya, Japan

[73] Assignee: Aisin Seiki Kabushiki Kaisha, Kariya, Japan

[21] Appl. No.: 189,841

[22] Filed: May 3, 1988

[30] Foreign Application Priority Data

May 11, 1987 [JP] Japan .................. 62-113776

[51] Int. Cl.⁴ ............................................. A47C 7/36
[52] U.S. Cl. ................................. 297/410; 297/353; 297/391
[58] Field of Search .................. 297/410, 391, 353

[56] References Cited

U.S. PATENT DOCUMENTS

| | | | |
|---|---|---|---|
| 3,563,602 | 2/1971 | Ohta | 297/410 |
| 3,567,282 | 3/1971 | Ohta et al. | 297/410 |
| 4,411,470 | 10/1983 | Nishimura et al. | 297/410 |
| 4,478,456 | 10/1984 | Mitsui | 297/410 |
| 4,577,904 | 3/1986 | Wiese et al. | 297/410 |
| 4,604,777 | 8/1986 | Meeks | 297/410 |
| 4,695,095 | 9/1987 | Faust et al. | 297/410 |

Primary Examiner—Francis K. Zugel
Attorney, Agent, or Firm—Finnegan, Henderson, Farabow, Garrett & Dunner

[57] ABSTRACT

A headrest apparatus is provided with a support member disposed within a seatback, a stay guide member slidably supported on the seatback, a stay slidably supported on the seatback through the stay guide member and fixedly connected to a headrest, and a locking means fixedly connected to the support member and engageable with the stay in accordance with the stay guide member and for limiting the slidable movement of the stay.

1 Claim, 2 Drawing Sheets

HEADREST APPARATUS

BACKGROUND OF THE INVENTION

The present invention is directed to a headrest apparatus and more particularly to a headrest apparatus for vehicles adapted with an upward and downward locking device.

A conventional device of this type is disclosed in Japanese Laid Open Pat. No. 58 (1983)-112511 which was laid-opened on July 5, 1983. The conventional device is provided with a support member disposed in a seatback and mounted up- and downwardly slidable by a source of compressed air. A stay of the headrest is slidably supported on a seatback frame via a stay guide, and it fixedly connected to the support member by means of a screw. Accordingly, the control of the up and down movement of the headrest is performed by up- and downwardly moving the support member in accordance with the supply and discharge of compressed air.

However, since the stay of the headrest is attached to the support member with a screw in the conventional headrest apparatus, it was very difficult to remove the headrest from the seatback. For instance, when a user wants to change a seat cover, it becomes very troublesome for him.

According to the present invention, a locking means is fixedly connected to a support member and engageable with a stay by a up- and downward movement of a stay guide member for regulating the movement of the stay. The locking means is actuated by moving the stay guide member and the stay is thus removable from the support member. As a result, the headrest can be removed from the seatback at any time, if it is desired.

SUMMARY OF THE INVENTION

The present invention provides a new and improved headrest apparatus for vehicles which overcomes the drawbacks of the above described conventional device. More specifically the present invention provides a new and improved headrest apparatus for vehicles in which a headrest can be easily removed from a seatback frame and attached therewith.

The foregoing and other objects, features and advantages of the invention will be apparent from the following more particularly description of a preferred embodiment of the invention as illustrated in the accompanying drawings.

DETAILED DESCRIPTION OF THE INVENTION

Figure 1:
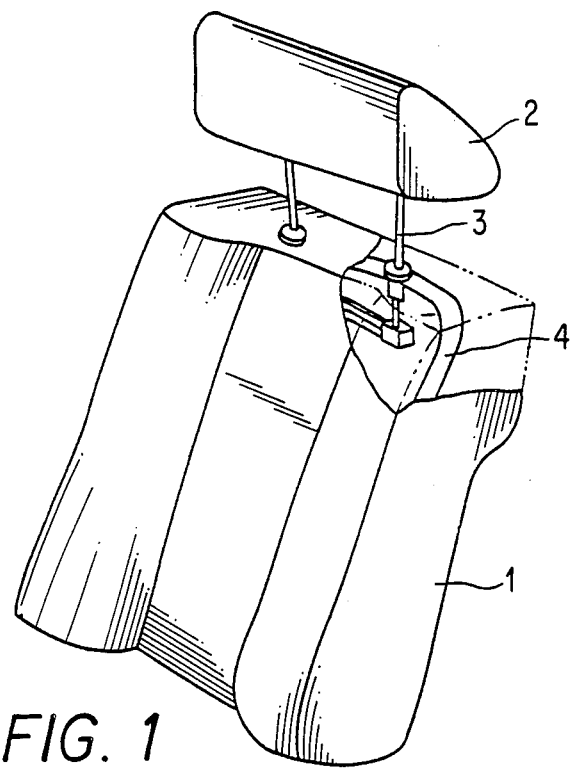
FIG. 1 is a perspective view of a headrest apparatus according to the present invention.

Now referring to FIG. 1, a headrest 2 is mounted on an upper portion of a seatback 1 to which a stay 3 is fixed and is slidably supported on a seatback frame.

Figure 2:
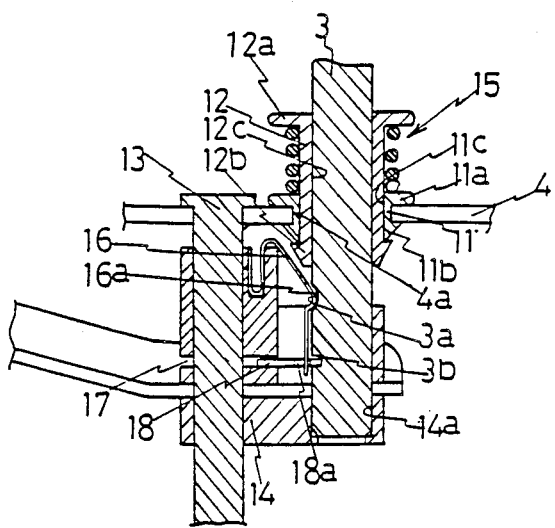
FIG. 2 is a cross sectional view of a main portion in FIG. 1.

As shown in FIG. 2, a rail 13 is fixed to the seatback frame 4 and a support member 14 is slidably supported on the rail 13. The support 14 is up- and downwardly slidable along the rail 13 by a driving device (not shown) in FIG. 2.

A bushing 11 of which one end forms a flange portion 11a and other end a nail portion 11b is fixedly inserted into in an inserting hole 4a of the seatback frame 4 at the flange and nail portions 11a, 11b. A stay guide member 12 of which one end forms a flange portion 12a and other end a nail portion 12b is slidably inserted in a penetrating hole 11c of the bushing 11. The stay guide member 12 is constructed such that the stay guide member 12 is not removed from the bushing 11 by the flange and nail portions 12a, 12b. The bushing 11 is made of a plastic resin for attaining a smooth slidable movement of the stay guide member 12. A spring 15 is interposed between the bushing 11 and the stay guide 12 and the one end of the spring 15 is supported on the flange portion 12a of the stay guide member 12 and other end thereof on the flange portion 11a of the bushing 11. The spring 15 always urges the stay guide 12 in the upward direction in FIG. 2. The stay 3 is inserted into a penetrating hole 12c formed on the stay guide 12 and is slidably supported. An end portion of the stay 3 is inserted into an inserting hole 14a formed on the support 14.

A locking device is described hereinafter:

As shown in FIG. 2, a plate spring 16 is fixed to the support member 14 and is integrally provided with a projecting portion 16a and is always rightwardly urged in FIG. 2 so as to be fixedly connected the projection 16a and a concave portion 3a formed on the stay 3. A slit 17 is formed on the support member 14 and a locking plate 18 is slidably supported in the slit 17.

Figure 3:
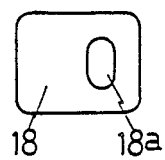
FIG. 3 is a plan view of a locking plate.

A hole 18a is provided on the locking plate 18 as clearly viewed from FIG. 3 and a free end of the plate spring 16 is inserted in the hole 18a and the locking plate 18 is engageable with a recess portion 3b of the stay 3.

Now, the operation of the present invention is described as follows:

FIG. 2 indicates the state in which the headrest 2 is locked at the maximum position where the headrest 2 can slide. In this state, the support member 14 is downwardly slided along the rail 13 by the driving device (not shown). At this time, the stay 3 and the support 14 are connected by the locking plate 18, so that the stay 3 is integrally slided with the support 13. As a result, the headrest 2 is downwardly moved in FIG. 1. Further, when the driving device is reversibly driven at the minimum position of the headrest 2, the support member 14 is upwardly slided. As a result, the headrest can be upwardly moved. As above mentioned the headrest can be regulated to a desired position of the user.

Figure 4:
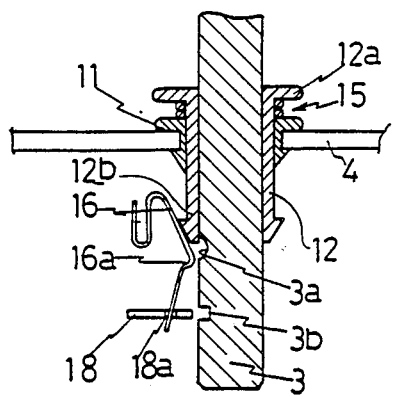
FIG. 4, 5 are views showing the actuation of the present invention.

Next, when the stay guide member 12 is downwardly depressed against the urging force of the spring 15 by the user in FIG. 2, the plate spring 16 is depressed to the position shown in FIG. 4 against the urging force of the plate spring 16 by the rail portion 12b of the stay guide member 12 as shown in FIG. 4. Accordingly, the fixed connection between the projecting portion 16a of the spring 16 and the concave portion 3a of the stay 3 is disengaged. Further, the locking plate 18 slides leftwardly within the slot 17 in FIG. 2.

Figure 5:
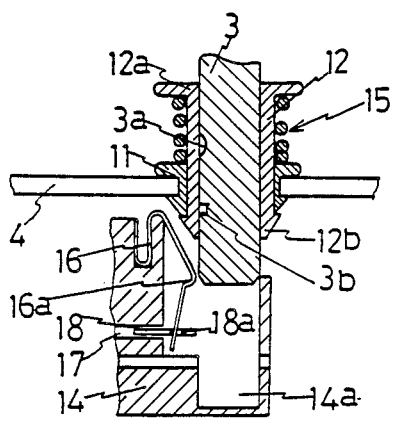

Thus, the engagement between the locking plate 18 and the stay 3 is disengaged and it becomes an unlocking state, so that the stay 3 becomes slidably removable from the support member 14. At this time, the stay guide member returns to an initial position by the urging force of the spring 15 and the plate spring 16 returns to an initial position. As this result, the headrest 2 can be removed from the seatback 1. Therefore, the change of a seat cover can be easily performed. Further, when the headrest apparatus of the present invention is utilized for the front seat, the view of a person seated on the rear seat can be assured. In the case that the removed headrest 2 is attached on the seatback 1, the top end of the stay depresses the plate spring 16 by inserting the stay 3 into the inserting hole 12c of the stay guide member 12 as shown in FIG. 5 and the locking plate 18 is slided to the unlocking position. Accordingly, the stay 3 is smoothly inserted without catching with the locking plate 18 and is inserted into the inserting hole 14a of the support 14. When the concave portion 3a of the stay comes to the position fixedly connected to the projecting portion 16a of the plate spring 16, the concave portion 3a and the projecting portion 16a are fixedly connected by the urging force of the plate spring 16. As this result, the locking plate 18 is engaged with the recess portion 3b of the stay 3. Thus, the stay becomes a locking state and is integrally slidable with the support member 14.

As above mentioned, the locking device of the headrest 2 is disposed in the seatback 1, so that the locking device can not be seen from outside and a switch for unlocking the locking device is the stay guide member 12. Thus, a special switch is not required and the outer appearance of the surface of the seatback 1 can be improved. Furthermore, the locking device can be unlocked just by downwardly depressing the stay guide 12, so that the stay guide 12 can be covered by the outer layer of the seatback 1 and the outer appearance of the surface of the seatback 1 can be more improved.

While the invention has been particularly shown and described with reference to preferred embodiments thereof it will be understood by those in the art that the foregoing and other changes in form and details may be made therein without departing from the spirit and scope of the invention.

What is claimed is:

1. A headrest apparatus, comprising:

a seatback frame having a top portion and an aperture formed in said top portion;

a rail fixedly extending downward from said top portion of said frame;

a support member slidably mounted on said rail;

a stay guide member movably positioned within said aperture of said frame, said stay guide member having a central hole therethrough and a bottom end extending below said top portion of said frame;

a spring disposed between said guide member and said frame to bias said guide member upwardly relative to said top portion of said frame;

a stay disposed in said hole of said guide member, said stay having a top end on which a headrest is mounted and a bottom end supported by said support member such that the height of said headrest is adjustable in accordance with sliding movement of said support member relative said rail, said bottom portion of said stay having a first recess formed therein;

a leaf spring having a proximal end and a distal end, said proximal end being mounted on said support member and said distal end being biased against said bottom end of said stay;

a locking plate slidably mounted in a slit formed in said support member, said locking plate having an aperture through which an extreme end portion of said distal end of said leaf spring extends;

wherein one end of said locking plate is biasedly inserted into said recess of said bottom portion of said stay by said leaf spring when said stay is supported by said support member to thereby lock said stay relative to said support member, and wherein said locking plate is removable from said recess by downward movement of guide member and corresponding contact of said bottom end of said guide member with said leaf spring to thereby move the distal end of said leaf spring away from said stay and withdraw said locking plate from said recess to permit withdrawal of said stay through the hole of said guide member.

* * * * *